JAMES B. MILLER.
Improvement in Reaming Tools.
No. 119,989.                                  Patented Oct. 17, 1871.
Fig. 1.
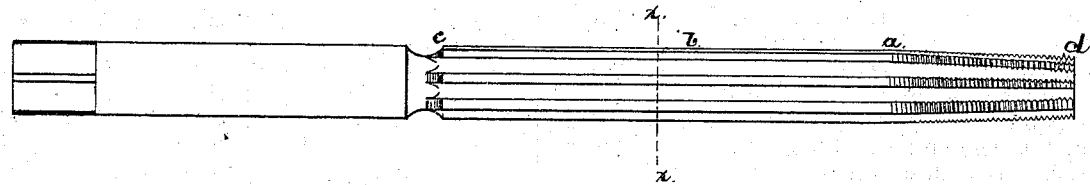
Fig. 2.            Fig. 3.
  
Witnesses.                           Inventor.
W. Bradford                          James B. Miller.
W. E. Henderson                      by John J. Halsted
                                        his Attorney.

C. A. MOORE.
*Pressed Glass Clock Case.*
No. 119,990.　　　　　　　　　　Patented Oct. 17, 1871.
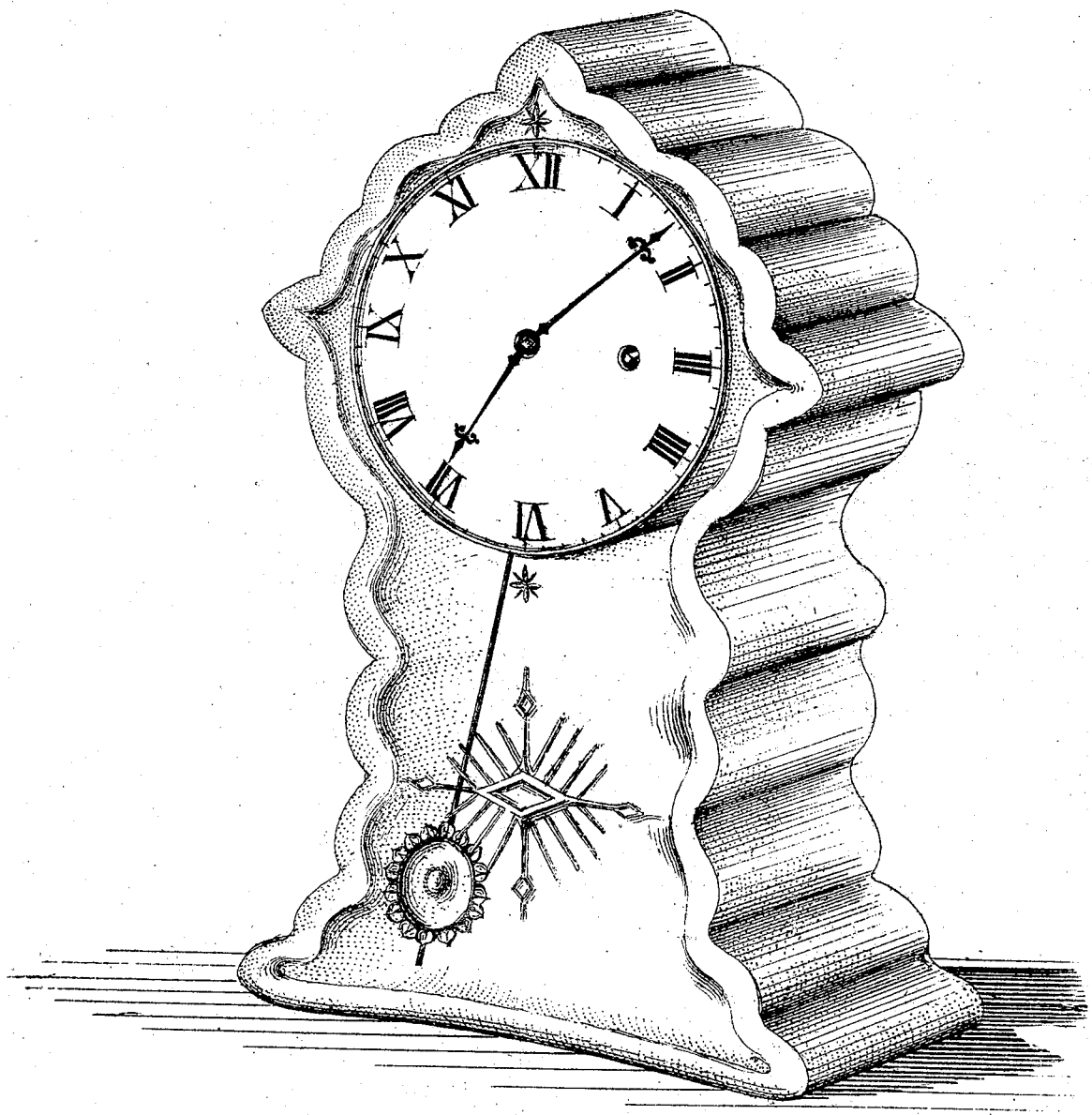
Witnesses:
Phil. T. Dodge
A. Moore
Inventor:
C. A. Moore
by Dodge & Munn
his Attys